Dec. 2, 1930.  G. C. PEARCE  1,783,520
THERMAL CONTROL SYSTEM
Filed Oct. 6, 1928

INVENTOR
George C. Pearce.
BY Wesley G. Carr
ATTORNEY

Patented Dec. 2, 1930

1,783,520

UNITED STATES PATENT OFFICE

GEORGE C. PEARCE, OF PITTSBURGH, PENNSYLVANIA, ASSIGNOR TO WESTINGHOUSE ELECTRIC & MANUFACTURING COMPANY, A CORPORATION OF PENNSYLVANIA

THERMAL CONTROL SYSTEM

Application filed October 6, 1928. Serial No. 310,713.

My invention relates to motor-protective circuits and systems and more particularly to thermally-energized motor-protecting means.

An object of my invention is to provide a thermally-energized protecting means for a motor that shall embody one element for protecting the starting resistance during the starting operation only and another element for protecting the motor itself after starting.

It is a further object of my invention to provide a means of the kind set forth in the preceding paragraph that shall be relatively simple and easily installed, and that shall operate properly under substantially all conditions of operation to which a circuit and device of this kind may be subjected.

In practicing my invention, I provide, in one embodiment, a plural-element, thermally-actuable control means electrically connected in circuit with a motor in such manner that one element of the protecting means will be effective to cause deenergization of the motor and the starting resistance during starting of the motor only, while the other element will be effective to cause deenergization of the motor during operation thereof after starting.

In a modification, the two elements may be operatively separated but are effective for the same purpose.

Figure 1:
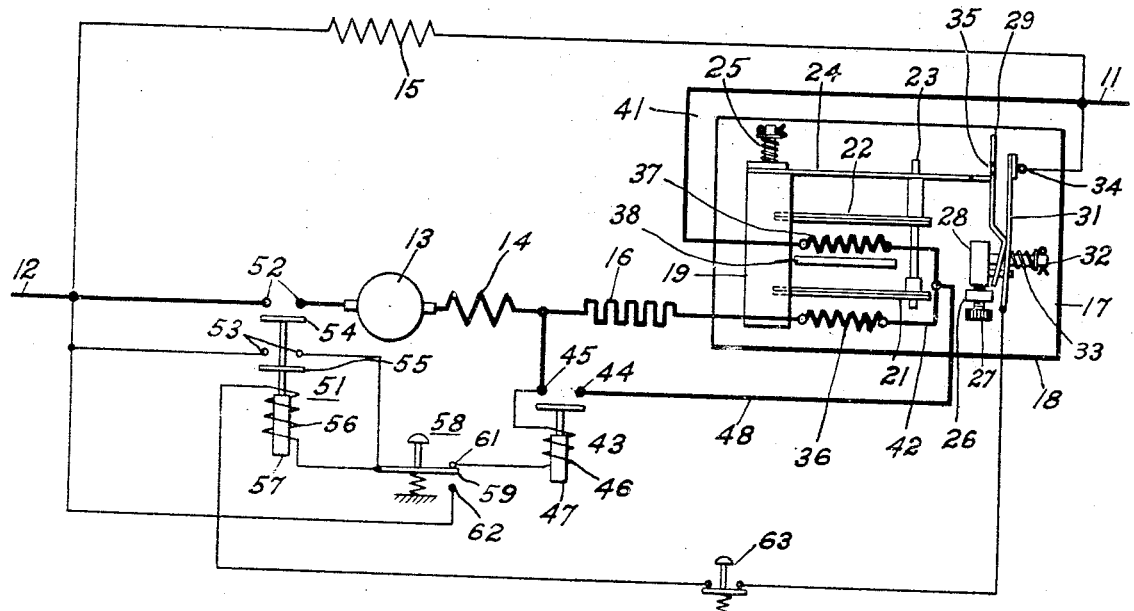
Figure 2:
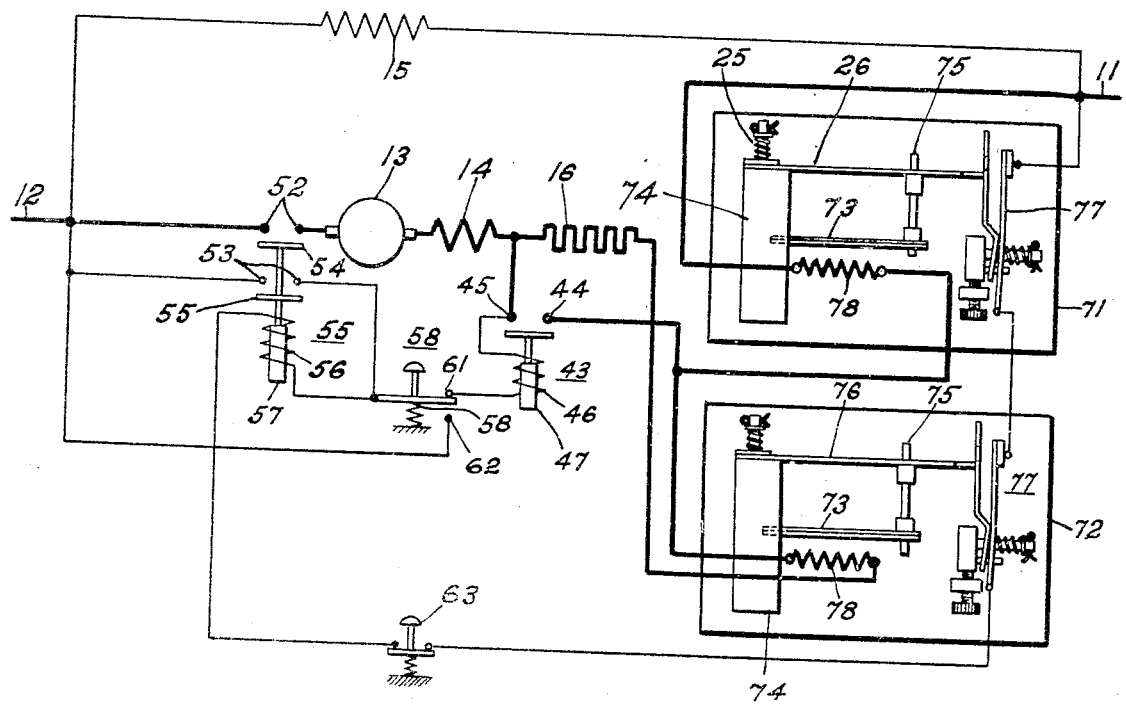

In the single sheet of drawings,

Figure 1 is a schematic diagram of connections and a plan view of a device embodying my invention, and Fig. 2 is a diagram of connections and a plan view of thermal relays comprising the device and system embodying my invention in a modified form.

Referring to Fig. 1 of the drawing, I have there illustrated a supply circuit, comprising electric conductors 11 and 12, which, for convenience and for illustrative purposes, may be considered as a direct-current supply circuit of any appropriate voltage.

A motor is electrically connected to the circuit 11—12 and is here illustrated as embodying a rotor 13, a series-connected winding 14, and a shunt winding 15. While I have illustrated, schematically, a direct-current motor, I desire it to be understood that, in its broadest aspects, my invention is applicable to any kind of motor and that, therefore, the armature or rotor 13 is to be considered broadly as a motor member.

A starting resistance 16 is connected in series-circuit relation to the winding 14 and the armature 13. In the diagrams of connections shown in this application, the method of starting and of control of the starting resistance is by the counter-electromotive force method; that is, means are provided, as will be hereinafter described, for short-circuiting the starting resistance when the rotor of the motor has reached a predetermined speed.

A plural-element, thermal-protecting means 17 comprises a base 18 of suitable electric-insulating material which has a substantially fixed supporting member 19, preferably of electric-insulating material, mounted thereon. Two bimetal elements 21 and 22, of strip or bar shape, have corresponding ends suitably attached to the support 19, the other ends being free to move in response to changes of temperature of the ambient air or of the bimetal strips themselves. The strips are provided with openings near their free ends to receive a push rod 23 of electrical-insulating material. The push rod is provided with shoulder portions in order that it may be actuated by either or both of the bimetal strips.

A latching bar 24 has one end mounted upon the upper end of the support 19 and is maintained yieldingly in position by a spring 25 fitting over a pin and held by a cotter pin and washer.

A switch, that is mounted on the base 18, comprises a substantially fixed block 26 through which extends an adjusting screw 27 one end of which fits into a sliding block 28. The block 28 carries a latching strip 29 and a switch blade 31, as well as a pin 32 on which is located a helical compression spring 33.

A contact post or terminal 34 is mounted on the base 18, and the normal arrangement and positions of the parts of the switch are such that one end of the switch blade 31 is normally in yielding engagement with it.

The latching strip 29 is provided with an opening 35 adjacent to its upper end to receive the free end of the latching bar 24 which normally engages the adjacent face of the member 29 below the opening.

If the free ends of the bimetal strips 21 and 22 move upwardly, or the free end of either strip so moves, the rod 23 will cause upward movement of the outer end of the latch 24 and, when the outer end thereof is moved upwardly a sufficient distance to register with the opening 35, the spring 33 will cause disengagement of the blade 31 from the terminal 34.

Two heating elements 36 and 37 are mounted on the base 18, the heating element 36 being located closely adjacent to the bimetal strip 21, and the heating element 37 being located closely adjacent to the bimetal strip 32. A barrier 38 is also mounted on the base 18 in order to prevent heat from the element 37 from affecting the bimetal strip 21.

A conductor 41 connects the supply-circuit conductor 11 to one terminal of the heating element 37 and a suitable conductor 42 connects the other terminal of element 37 to one terminal of element 36, the other terminal of which is connected to one terminal of the starting resistance 16.

A contactor 43 embodies fixed contact members 44 and 45, an actuating coil 46 and a magnetizable core member 47 having a contact-bridging member, of usual construction. A conductor 48 connects the conductor 42 to contact terminal 44. The contact terminal 45 is connected to the common terminal of starting resistance 16 and winding 14.

A contactor 51 comprises an upper pair of fixed contact terminals 52, a lower pair of fixed contact terminals 53, contact-bridging members 54 and 55, an actuating winding 56 and a core member 57. One of the contact terminals 52 is connected to one terminal of the rotor 13 while the other is connected to the supply-circuit conductor 12. One of the contact terminals 53 is connected to the circuit conductor 12 while the other is connected to one terminal of a "start" switch 58, as well as to one terminal of the actuating coil 56. The start switch 58 comprises a manually actuable blade or bar 59, normally spring-biased into engagement with a contact terminal 61, and a second contact terminal 62 which is electrically connected to the supply-circuit conductor 12. The terminal 61 is connected to one terminal of the actuating coil 46 of contactor 43 while the other terminal of this coil is connected to the terminal 45.

The other terminal of the coil 56 of the contactor 51 is connected to one contact terminal of a manually operable "stop" switch 63, the other terminal of which is connected to the switch blade 31.

Referring more particularly to Fig. 2 of the drawings, I have there illustrated a plurality of single-element thermal relays or thermal protecting means, all the other elements of the circuit being the same as described above in connection with Fig. 1 of the drawings.

Two single-element thermal relays 71 and 72 are illustrated, each comprising a single bimetal strip 73 mounted on a support 74, a latch-operating rod 75, a latch 76 and a switch 77 embodying the same elements as set forth hereinbefore in connection with the thermal protecting means 17. A single heating unit 78 is provided in operative association with each of the bimetal strips 73.

Inasmuch as the thermal protecting means 72 is the same as the means 71, it is believed to be neither necessary nor desirable to describe it separately and, for the same reason, the other elements of the circuit, such as the contactors 43 and 51, the start switch 58 and the stop switch 63 have been provided with the same reference numerals.

Referring to Fig. 1 of the drawings, let it be assumed that the supply-circuit conductors 11 and 12 have been connected, through a suitable switch (not shown) to a source of supply in order to energize the motor, in which case the following circuit may be traced: from conductor 11 through the shunt field winding 15 to the other conductor 12. No other circuit will be completed so long as the start switch 58 remains in the open position shown in the drawing.

If the member 59 of the switch 58 be manually actuated to effect engagement of its free end with the terminal 62, the following circuit will be established: from conductor 11, through terminal 34, switch blade 31, stop switch 63, actuating coil 56 and the manually-actuated blade 59 of the start switch 58, to terminal 62 and from there to the conductor 12.

The energized coil 56 causes upward movement of the core member 57 to effect engagement of bridging member 54 with terminals 52 and to effect engagement of bridging member 55 with terminals 53. The engagement of bridging member 55 with terminals 53 provides a holding circuit for the coil 56.

The engagement of bridging member 54 with terminals 52 provides or closes a circuit traceable from conductor 11, through conductor 41, resistance 37, conductor 42, resistances 36 and 16, winding 14, rotor 13, terminals 52 and bridging member 54, to the other supply circuit conductor 12. This will cause the motor to start and, after a predetermined length of time, dependent upon the starting conditions, to increase its speed and the resultant counter-electromotive force.

Another circuit will be closed which may be traced from the conjunction of the winding 14 and the starting resistance 16 to terminal 45, through coil 46 to terminal 61, blade 59, terminals 53 and the bridging member 55 and back through the terminals 52 and bridging member 54, the rotor 13 and the winding 14. The coil 46 is so designed and constructed that it will sufficiently energize the core 47 to cause it to move upwardly into engagement with the terminals 44 and 45 when the counter-electromotive force of the rotor has reached a predetermined value. This action of the contactor 43 short-circuits the resistance 16, as well as the heating element 36.

It is usual, in motor-control systems of this general character, to design the starting resistance 16 for the particular cycle of operation of the motor and it may happen that the capacity of the starting resistance is not the same as that of the rotor. It may also happen, because of a faulty condition of the circuit or because of sudden extreme overloads on the motor, that the coil 46 is not sufficiently energized to effect operation of the contactor as hereinbefore described, in which case, in the absence of any protective means, the starting resistance would be destroyed by over-heating.

The heating element 36 hereinbefore described is so designed and located that it will heat the bimetallic strip 21 to such degree and in such interval of time as to cause movement of the rod 23 upwardly to effect disengagement of the blade 31 from the terminal 34 within a sufficiently short time to prevent over-heating the starting resistance to an abnormal or dangerous degree.

As was hereinbefore set forth, the heating element 36 is short-circuited after the starting operation of the motor has been completed and it is effective, therefore, only during the starting operation. On the other hand, the heating element 37 remains in circuit continuously and is, therefore, effective to cause interruption of the holding circuit, by means of disengagement of the blade 31 from the terminal 34, whereby the coil 56 of the contactor 51 is deenergized and the motor is restored to its deenergized condition.

The adjusting screw 27 permits of varying the temperature of the bimetallic elements 21 and 22 at which they are effective to cause opening of the holding-circuit controlling switch so that proper adjustment may be made, as may be necessary or desirable.

It is to be noted, however, that any adjustment affects the temperature of both strips to substantially the same degree and if this is objectionable, the two single-element protective means shown in Fig. 2 of the drawing may be employed.

It is, of course, obvious that individual adjustment of the respective temperatures may be effected, and a control means of this kind will, therefore, permit of its use under a larger number of different operating conditions than would be the case if the thermally energized protective means were so constructed and arranged as to have a single adjusting means only.

Various modifications may be made in the device and system embodying my invention without departing from the spirit and scope thereof and I desire, therefore, that only such limitations shall be placed thereon as are imposed by the prior art or are set forth in the appended claim.

I claim as my invention:

A thermal control system for a motor circuit including a starting resistance and two heating elements in series circuit with each other and with the motor, an electromagnetic circuit controller for the motor circuit, means for short circuiting the starting resistance and one of said heating elements and an auxiliary normally-closed switch for controlling the electromagnetic circuit controller, a pair of thermally-actuable elements individually energized by the two heating elements for causing opening of the auxiliary switch under predetermined abnormal conditions during starting and during running of the motor respectively.

In testimony whereof, I have hereunto subscribed my name this 22nd day of September 1928.

GEORGE C. PEARCE.